Feb. 4, 1947.  R. M. GODFREY ET AL  2,415,386
CAMERA
Filed Feb. 20, 1943  5 Sheets-Sheet 3
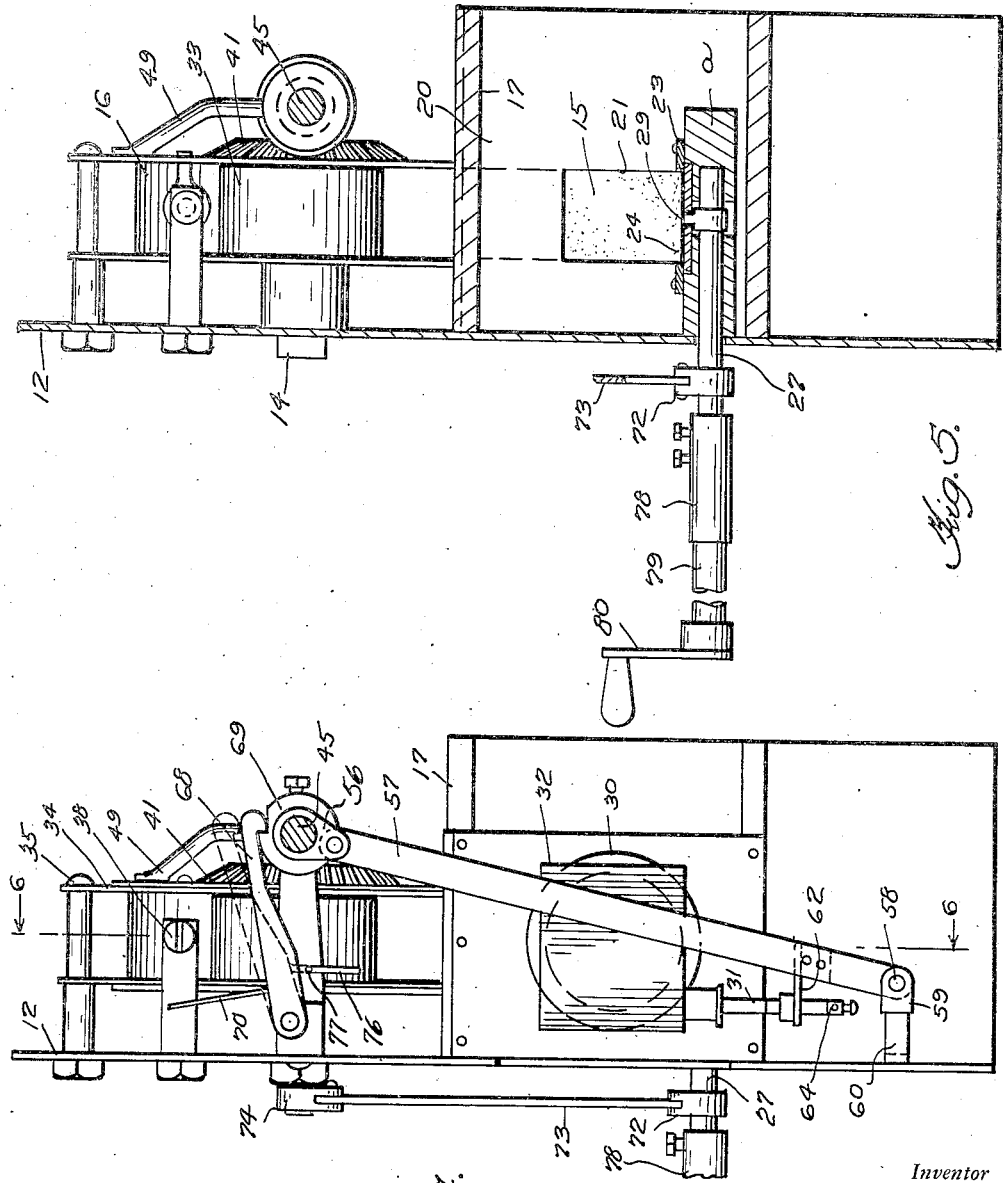

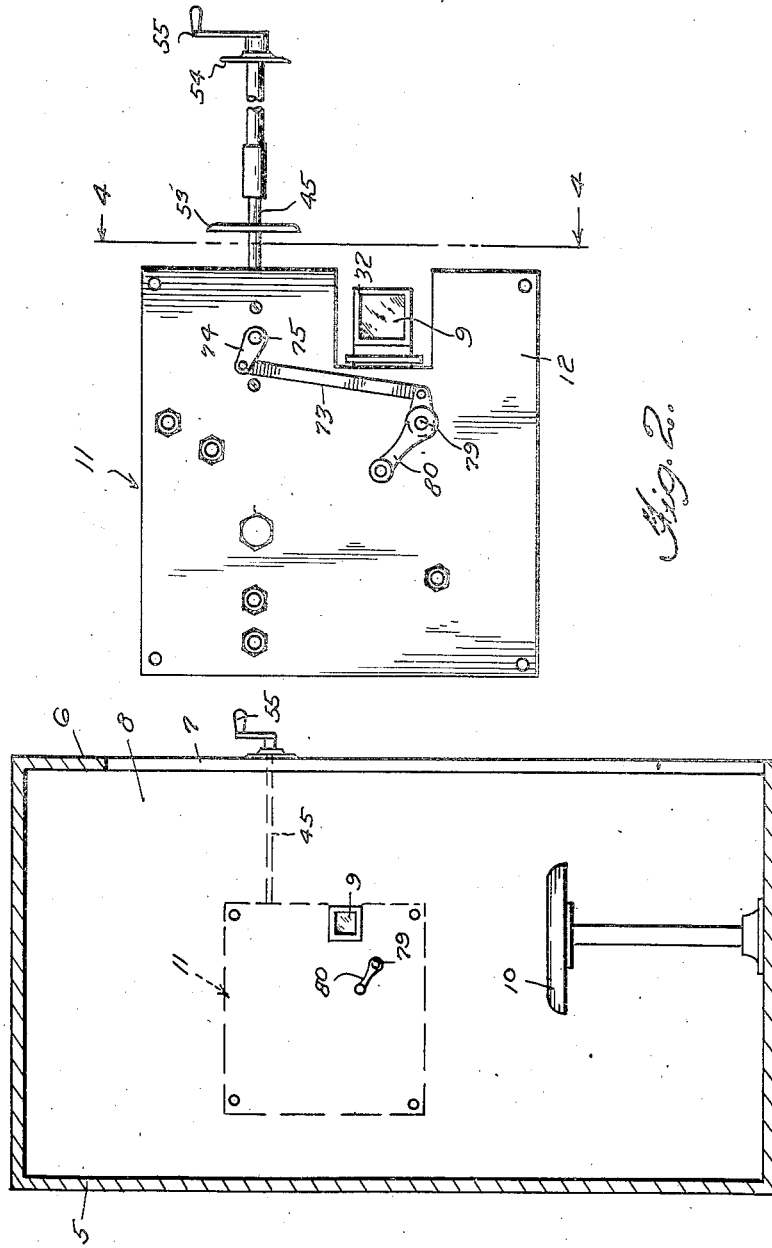

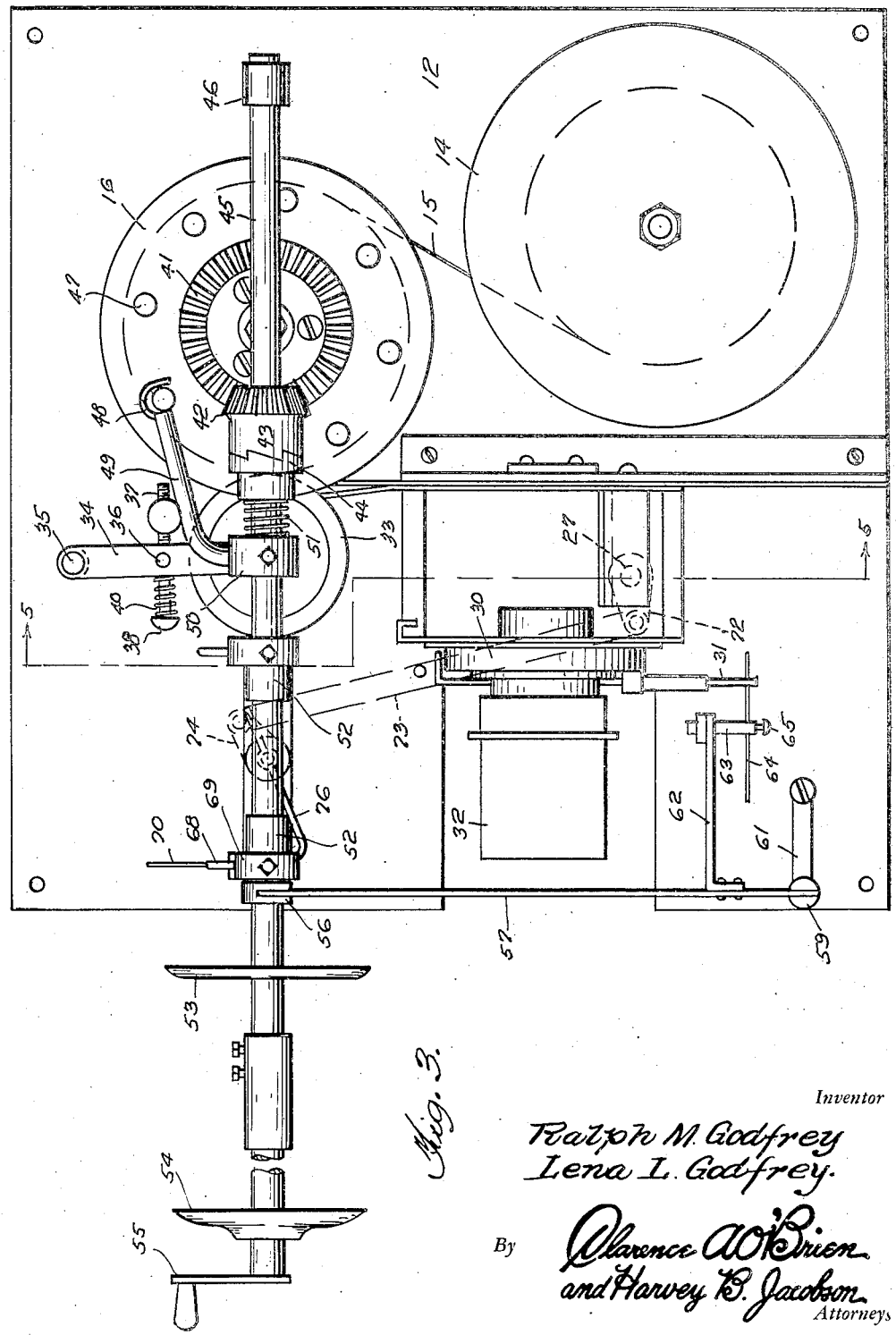

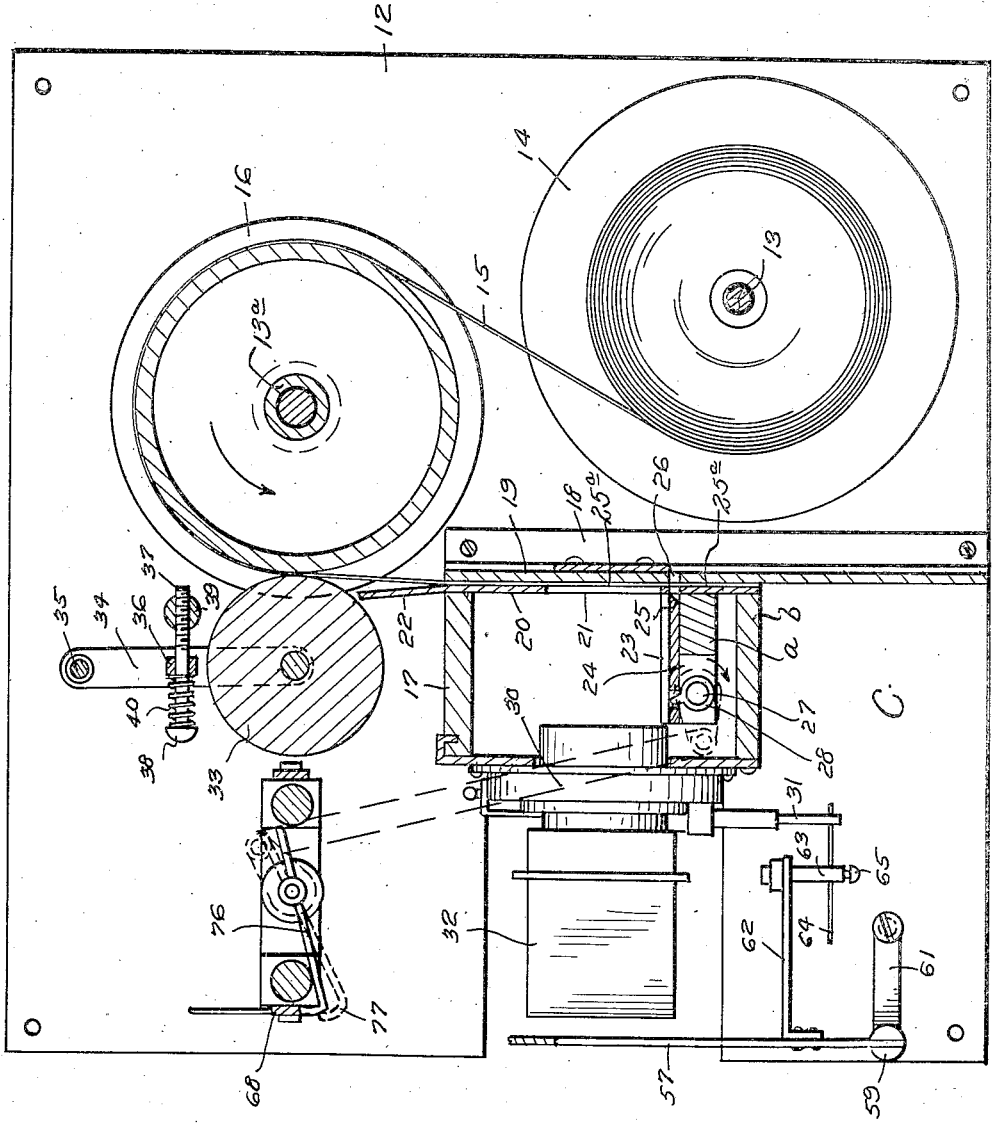

Feb. 4, 1947.　　　R. M. GODFREY ET AL　　　2,415,386
CAMERA
Filed Feb. 20, 1943　　　5 Sheets-Sheet 5

Inventor
Ralph M. Godfrey
Lena L. Godfrey

By Clarence A. O'Brien
and Harvey B. Jacobson
Attorneys

Patented Feb. 4, 1947

2,415,386

UNITED STATES PATENT OFFICE 2,415,386

CAMERA

Ralph M. Godfrey and Lena L. Godfrey, Lima, Ohio, assignors to J. Banning Smith, Lima, Ohio Application February 20, 1943, Serial No. 476,571

3 Claims. (Cl. 95—31)

This invention relates to new and useful improvements in cameras of the automatic type and in conjunction with which a booth is provided for the subject.

An important object of the invention is to provide a camera of the character described which will be easy to manipulate and substantially fool-proof in operation.

Another important object of the invention is to provide a substantially automatic camera wherein the parts are readily accessible for the purpose of repairs, replacements and checking at all times.

Still another important object of the invention is to provide an automatic camera which is of such simple construction as to permit its manufacture at a substantially less cost than devices of this character now on the market.

Other objects and advantages of the invention will become apparent to the reader of the following description.

In the drawings:

Figure 1 represents a vertical sectional view through the booth and looking at the lens-carrying wall of the same.

Figure 2 is a side elevational view of the camera mechanism.

Figure 3 is an enlarged inside elevational view of the camera mechanism.

Figure 4 is an end elevational view of the camera mechanism.

Figure 5 is a vertical sectional view taken substantially on line 5—5 of Figure 3.

Figure 6 is a section taken substantially on line 6—6 of Figure 4.

Figure 7:
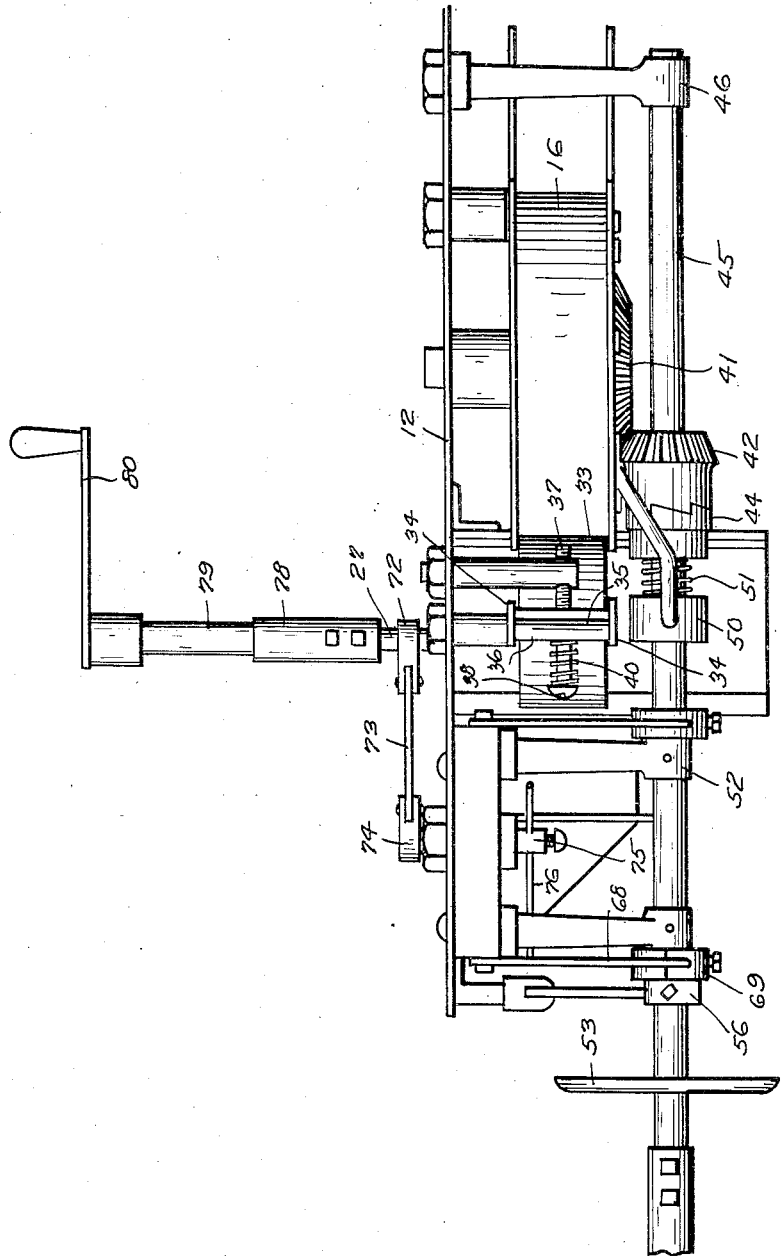
Figure 7 is a fragmentary top plan view of the mechanism.

Referring to the drawings wherein like numerals designate like parts, it can be seen in Figure 1 that numeral 5 denotes a cabinet including a front wall 6 having an entrance opening 7 and a lens-carrying wall 8 having an opening in which a camera lens 9 is located. A stool or other form of seat 10 is located within this booth 5 upon which a subject can sit.

Numeral 11 generally refers to the camera mechanism, and this includes a side plate 12 from which projects a pair of vertically spaced spindles 13, 13a. On the spindle 13 is a film reel 14 from which the film 15 is payable to pass over a guide reel 16 carried by the spindle 13a.

Numeral 17 denotes a camera box suitably secured to the plate 12 and to a flange member 18. The box 17 is provided with a back wall 19 and spaced inwardly from this back wall 19 is a plate 20 having a picture-defining opening 21 therein. The plate 20 extends vertically through the box 17, extending upwardly and being inclined outwardly, as at 22, to serve as a guide for the film strip.

It also extends downwardly below the bottom of the camera defining a slot 25a between it and the back plate 19.

The plate extends to the bottom 6 of the camera structure and the slot 25a opens into the dark space c where provisions are made for collecting the film or paper strips and for processing the same. These means and appliances are not shown as they do not form part of this invention.

A guide structure 23 is provided at the bottom of the box 17 and between this and the bottom a of the box 17 is a cutter blade 24, the sharpened edge of which is operative through openings 25 and 26 in the plate 20 and back wall 19 in order to cut the film strip 15.

Extending through a bifurcated portion of the bottom a of the box 17 is a shaft 27 carrying a collar 28 on which is a finger 29 which operates in an opening of the blade 24. Obviously, when the shaft 27 is rotated, the finger 29 will serve to shift the blade 24.

At the front of the camera box 17 is a suitable shutter mechanism 30 adapted to be operated by a plunger 31. Extending from the shutter mechanism 30 is a periscopic box 32, this box having at the end thereof which reaches the wall a, the lens 9, as shown in Figure 1. This box contains a mirror set at a 45 degree angle with respect to the lens 9 and shutter mechanism 30.

The film or sensitive paper strip 15 has a pressure roll 33 for normally engaging the same, this pressure roll being supported by a pair of hanger members 34 swingable on a pin 35 projecting from the plate 12. A bridge member 36 is provided between the hanger members 34 and through this is disposed a screw 37, having a head 38. The screw 37 is threaded and feedable through a projection 39 on the plate 12 to regulate the effect of a coiled compression spring 40 which is interposed between the bridge member 36 and the head 38. Thus, the amount of pressure against the film or paper strip 15 can be regulated.

As clearly shown in Figures 3 and 7, the reel 16 has a bevel gear 41 at one side thereof which has a beveled pinion 42 constantly in mesh therewith. This beveled pinion 42 has a clutch face 43 opposed to a clutch collar 44 slidably disposed on an elongated shaft 45, which is journaled through suitable bearings 46 on the plate 12.

The side of the reel 16 carrying the bevel gear 41 has a plurality of studs 47 projecting therefrom and being equally spaced apart adjacent the periphery of the reel.

These studs are adapted to be engaged by a hook member 48 on the free end of an arm 49 projecting from a collar 50 carried by the shaft 45. A coiled compression spring 51 is interposed between the collar 50 and the slidable clutch element 44.

The shaft 45 extends through additional bearings 52 and through suitable base plates 53, 54 to the exterior of the front wall 6 of the cabinet (see Fig. 1), where the shaft is provided with a crank handle 55.

In order to operate the shutter mechanism, the shaft 45 carries a sleeve with a short crank arm 56 to which the upper end of a connecting rod 57 pivotally connects, the lower end of this rod 57 being pivotally connected, as at 58, to a bifurcated member 59 which is secured by means of a swivel connection to the foot 60 of a pivoted arm 61. An arm 62 extends laterally from the connecting rod 57 and has a depending leg member 63. This leg member has a transverse opening in the lower portion thereof for receiving a wire member 64 adapted to be held in adjusted position by a set screw 65. The wire member connects to the plunger member 31 of the shutter mechanism 30. It is also to be understood that the leg member 63 is vertically adjustable with respect to the arm 62.

On a bracket 68a secured to the plate 12 a dog 68 is pivoted, the head portion of which is engageable with the shoulder defined by a notch in a ratchet member 69 carried by the shaft 45; a spring 70 exerts pressure against this dog 68 so that it normally rides the periphery of the ratchet member 69.

Extending through the lens-carrying wall 8 of the booth is the shaft 27 on which is a short arm 72 pivotally connected to a connecting rod 73 which extends upwardly to connect pivotally to a crank arm 74 on a short shaft 75 which extends through the wall 12 and carries a transversely disposed lock control member consisting of a stem 76 having a hooked end 77 which is engageable under the dog 68. (See Fig. 6.)

The shaft 27 is connected by a joint 78 to a short shaft 79 equipped with a crank handle 80 on the outside of the wall 8, where it can be operated by the subject.

Assuming now that the crank handle 80 on the outside of wall is in the position shown in Figure 2, which is a position in which the hooked end 77 of stem 76 lifts dog 68 from notched ratchet 69, and that the film or paper strip has been advanced so as to fill the opening 21; then the subject is placed on the seat in the booth and the attendant now proceeds to turn the crank handle 55. It will be observed that the normal position of the mechanism is that shown in Figure 3 in which the arm 49 engages studs 47 and locks the film and sensitive paper reel 16 in its position.

The operator in order to take a picture turns the crank handle 55 arranged outside and projecting from the wall first in a clockwise and then in an anti-clockwise direction, the extent of the movement being approximately a quarter turn. This movement back and forth produces one picture. It has to be repeated for every picture of the subject which is to be taken in succession or in addition to the first picture.

The rotation in a clockwise direction disengages the arm 49 from the studs 47. It turns arm 56, link 57 and arm 61 and thereby moves arm 62, and wire 64 so that the shutter 31 of the camera is operated. This movement does not rotate the film roll as coupling 43 and 44 is not operative in this direction.

When the operator returns the handle—the back and forth movement is really to be considered as one single operation—the teeth of coupling 43 and 44 engage and the rear part of shaft 45 is rotated; the bevel gears 41 and 42 rotate the film or paper reel counter-clockwise (when seen from the front in Figure 3) and thereby a length of film or paper corresponding to one picture is advanced by means of the roller 33 pressing firmly against the film or paper reel with an adjustable pressure under the influence of the spring 40. This firm grip between the reel and the roller will move the film or paper strip through the slot 25a. At the end of the return movement the arm 49 again are pressed against the reel 16 and are engaging the studs 47.

When the attendant repeats the operation, a second picture will be taken on the freshly advanced strip of film or paper and the film or paper strip will be further advanced and so forth.

After the agreed number of pictures has been taken, the subject seated in the booth moves the crank handle 80 from the position shown in Figure 2 to the right in this figure for approximately a quarter turn. This movement of the crank actuates shaft 27 and operates the lever system 72, 73, 74 and the lock control member 76, 77. Shaft 27 rocks member 28 and thereby moves the cutter 25, thus cutting off the film or paper strip below the opening 21.

It will have been observed that every movement of the crank handle 55 resulted in an exposure of that section of the film which happened to be behind opening 21 and thereafter in an advance of the exposed section beyond the said opening. Therefore, when the cutter is moved the exposed section of the film is severed from the unexposed section and drops into a suitable collecting means from whence it is taken for further treatment.

As the crank 80 is moved only after all the photos of one and the same subject are taken, each strip contains all the related photos.

At the same time the movement of the lever system locks the shaft 45 and crank handle 55. No further picture can, therefore, be made until crank handle 80 is moved back again. This prevents the attendant or an unauthorized person to make any further picture of the same subject until the crank has again been turned.

This arrangement permits the cooperation of the arrangement with a coin controlled registering or counting mechanism and it prevents erroneous unauthorized or inadvertent continuation of the picture taking operation.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In an automatic camera mechanism of the type having a booth for the subject a closed chamber containing a camera provided with a shutter, and a manually operated film advance, film exposure and film cutting mechanism, comprising a rotatable hand operated shaft extending through said closed chamber having an outwardly projecting section, a crank handle for manual operation outside of said closed chamber, operatively connected with said outwardly projecting shaft section, a film storing and film advancing means within said chamber, a locking member mounted on said shaft adapted to be brought into operative engagement with said film advancing means by rotation of the shaft in one direction, driving gear members for said film advancing members operative upon rotation of said shaft in the opposite direction, means for operating the camera shutter including a crank on said shaft, a crank lever and shutter operating members operative when moving the said shaft in the first mentioned direction, said shaft a second hand operated rotational shaft provided with a second manually operated crank handle operatively connected with the film cutting mechanism and a locking mechanism for the first named shaft, operatively connected with the second shaft.

2. In an automatic camera mechanism of the type having a booth for the subject and a closed chamber containing a camera provided with a shutter, and a manually operated film advance, film exposure and film cutting mechanism, comprising a rotatable hand operated shaft extending through said closed chamber having an outwardly projecting section, a crank handle for manual operation outside of said chamber operatively connected with said outwardly projecting section, a film storing reel and a pair of film advancing roller driving means for one of said rollers, consisting in a bevel gear wheel connected with said roller and a cooperating gear wheel on said rotating shaft, a unidirectional coupling between said gear wheel and the rotating shaft, a locking arm on said shaft and locking studs on said driven film advancing roller, adapted to engage each other in the position of rest of the shaft, means for operating the camera shutter, connected with said shaft and including a crank mounted thereon a connecting rod moved by said crank, shutter operating members moved by said rod and operative upon a rotation of the shaft unlocking the film advance rollers, means for locking said hand operated rotational shaft, and a second hand operated rotational shaft, with a second crank handle operatively connected with the film cutting mechanism and a locking mechanism for the first named shaft, operated by the second hand operated shaft.

3. In an automatic camera mechanism of the type having a booth for the subject and a closed chamber containing a camera provided with a shutter, and a manually operated film advance, film exposure and film cutting mechanism, comprising a rotatable hand operated shaft extending through said closed chamber having an outwardly projecting section, a crank handle for manual operation outside of said chamber, operatively connected with said shaft section, a film storing reel and a pair of film advancing rollers, driving means for one of said rollers, consisting in a bevel gear wheel connected with said roller and a cooperating gear wheel on said rotating shaft, a unidirectional coupling between said gear wheel and the rotating shaft, a locking arm on said shaft and locking studs on said driving film advancing roller adapted to engage each other in the position of rest of the shaft, means for operating the camera shutter, connected with said shaft, a locking member on said rotating shaft, adapted to lock the same in a position of rest, a second locking member engaging the first named member, a lock control member for holding the same in a disengaged position, a second hand operated rotational shaft, projecting into the booth with a crank handle arranged within said booth, a film cutting means for severing the exposed film from the film in operative position in the camera and means connected with said second rotational shaft and with the aforesaid lock control member for controlling the engagement of the second locking member with the first locking member the operation of said second shaft resulting in the locking of the first named shaft in its position and simultaneously the severing of the exposed section of the film from the unexposed film advanced through the camera.

RALPH M. GODFREY.
LENA L. GODFREY.

REFERENCES CITED

The following references are of record in the file of this patent:

UNITED STATES PATENTS

| Number | Name | Date |
|---|---|---|
| 1,946,687 | Grant | Feb. 13, 1934 |
| 1,153,017 | Beidler | Sept. 7, 1915 |
| 1,846,571 | Rochestie, et al | Feb. 23, 1932 |